United States Patent [19]

Skikakura et al.

[11] Patent Number: 4,953,019
[45] Date of Patent: Aug. 28, 1990

[54] IMAGE SIGNAL ENCODING APPARATUS

[75] Inventors: Akihiro Skikakura, Atsugi; Yasuyuki Tanaka, Tokyo; Makoto Shimokoriyama, Kawasaki; Yoshiki Ishii; Tetsuya Shimizu, both of Yokohama; Shinichi Yamashita, Atsugi; Akio Fujii, Yokohama, all of Japan

[73] Assignee: Canon Kabushiki Kaisha, Tokyo, Japan

[21] Appl. No.: 440,490

[22] Filed: Nov. 22, 1989

Related U.S. Application Data

[63] Continuation of Ser. No. 275,503, Nov. 23, 1988, abandoned.

[30] Foreign Application Priority Data

| Nov. 27, 1987 | [JP] | Japan | 62-297403 |
| Nov. 27, 1987 | [JP] | Japan | 62-297406 |
| Nov. 27, 1987 | [JP] | Japan | 62-297408 |
| Nov. 28, 1987 | [JP] | Japan | 62-297407 |

[51] Int. Cl.⁵ .............................. H04N 7/12
[52] U.S. Cl. ................... 358/133; 358/135; 358/433; 375/27
[58] Field of Search ............... 358/133, 135, 136, 433; 375/27; 371/37.1

[56] References Cited

U.S. PATENT DOCUMENTS

| 3,940,555 | 2/1976 | Amano et al. | 358/135 |
| 4,703,352 | 10/1987 | Kondo | 358/135 |
| 4,710,811 | 12/1987 | Kondo | 358/135 |
| 4,722,003 | 1/1988 | Kondo | 358/135 |

Primary Examiner—John W. Shepperd
Assistant Examiner—Michael D. Parker
Attorney, Agent, or Firm—Fitzpatrick, Cella, Harper & Scinto

[57] ABSTRACT

An image signal encoding apparatus for encoding an image signal in which image of one picture plane consisting of a plurality of pixel data are divided into a plurality of blocks each consisting of a predetermined number of pixel data. For each of the blocks, a pair of reference value data regarding the maximum and minimum values of the levels of the pixel data constructing the block are formed. On the basis of the formed reference value data, encoded date is formed by encoding each of the pixel data of the block. Decoded data is formed by decoding the encoded data formed on the basis of the reference value data. By comparing each of the pixel data of the block with the decoded data, errors are detected. The reference value data are corrected in accordance with the result of the detection. Thus, the encoding errors are reduced and it is possible to perform the encoding with less deterioration in picture quality of the image signal.

16 Claims, 8 Drawing Sheets

IMAGE SIGNAL ENCODING APPARATUS

This application is a continuation of application Ser. No. 07/275,503, filed Nov. 23, 1988 now abandoned.

BACKGROUND OF THE INVENTION

1. Field of the Invention

The present invention relates to an image signal encoding apparatus to encode an image signal.

2. Description of the Related Background Art

Hitherto, an adaptive type dynamic range encoding has been known as a method of encoding an image signal highly efficiently (for instance, U.S. Pat. No. 4,703,352). In the adaptive type dynamic range encoding, all of the pixels constructing a picture plane are divided into a plurality of blocks each consisting of a few pixels. For each block the pixels are linearly digitized between the maximum and minimum values of the pixels in that block. The maximum and minimum values of the pixels and, or one of those values the dynamic range value (the difference between the maximum and minimum values), are transmitted together with the digitized values of the pixels.

According to the above encoding method, when the dynamic range in the block is small, the digitizing steps of each pixel become fine. On the contrary, when the dynamic range is large, the digitizing step becomes rough. Therefore, the proper digitization according to the characteristics of human vision can be performed. On the other hand, according to the conventional adaptive type dynamic range encoding method, the number of image transmission bits can be remarkably reduced. For instance, when encoding the image data of eight bits on a block unit basis consisting of $3 \times 6$ pixels, assuming that the number of digitization bits of each pixel in the block is four, the number of bits per block before compressing (encoding) is 144 ($=3 \times 6 \times 8$) bits. After the compression, on the other hand, each pixel datum consists of 72 ($=3 \times 6 \times 4$) bits and the number of bits of the data of the maximum value and minimum value is 16 ($=8 \times 2$) bits, so that the total number of bits is set to 88 ($=72+16$) bits and the number of bits can be compressed to about ⅔.

However, according to the conventional adaptive type dynamic range encoding method, in each block, since the inside of the dynamic range is uniformly divided and each pixel value is digitized, no consideration is paid to the distribution of the pixel values. Thus, there is a case where the digitization error of each pixel increases very considerably, depending on the particular image.

SUMMARY OF THE INVENTION

It is an object of the present invention to provide an image signal encoding apparatus which can solve the foregoing problems.

Another object of the invention is to provide an image signal encoding apparatus which can perform the encoding such as to reduce encoding errors and to suppress the deterioration of an image signal.

Under such objects, as one embodiment according to the invention, there is provided an image signal encoding apparatus for encoding an image signal, comprising: blocking means for receiving image signals of one picture plane consisting of a plurality of pixel data and for dividing the image signals into a plurality of blocks consisting of a predetermined number of pixel data; reference value data forming means for forming a pair of reference value data regarding the maximum and minimum values of the levels of the pixel data of the block, for each of the blocks defined by the blocking means; encoding means for encoding each of the pixel data of each block, on the basis of the reference value data formed by the reference value data forming means, for forming encoded data, and for outputting it; decoding means for decoding the encoded data formed by the encoding means on the basis of the reference value data formed by the reference value data forming means and for forming decoded data; error detecting means for comparing for each block, the pixel data which is output with the decoded data formed by the decoding means and for detecting an error; and correcting means for correcting the reference value data which is formed by the reference value data forming means in accordance with the result of the detection by the error detecting means and for outputting the corrected data.

The above and other objects and features of the present invention will become apparent from the following detailed description and the appended claims with reference to the accompanying drawings.

DETAILED DESCRIPTION OF THE PREFERRED EMBODIMENTS

Figure 1:
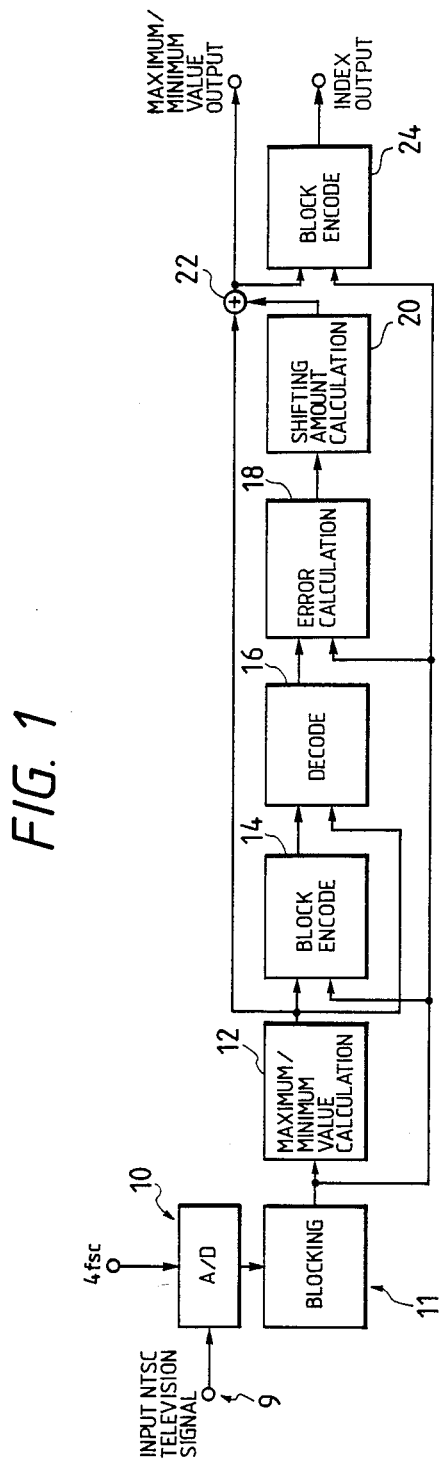
FIG. 1 is an arrangement block diagram of an encoding apparatus as the first embodiment of the present invention.

An embodiment of the present invention will be described hereinbelow with reference to the drawings. FIG. 1 is an arrangement block diagram of an encoding apparatus as the first embodiment of the invention. The television signal used in the embodiment complies with the NTSC system but the invention can be also applied to an apparatus for encoding the television signal based on the other system.

Figure 2:
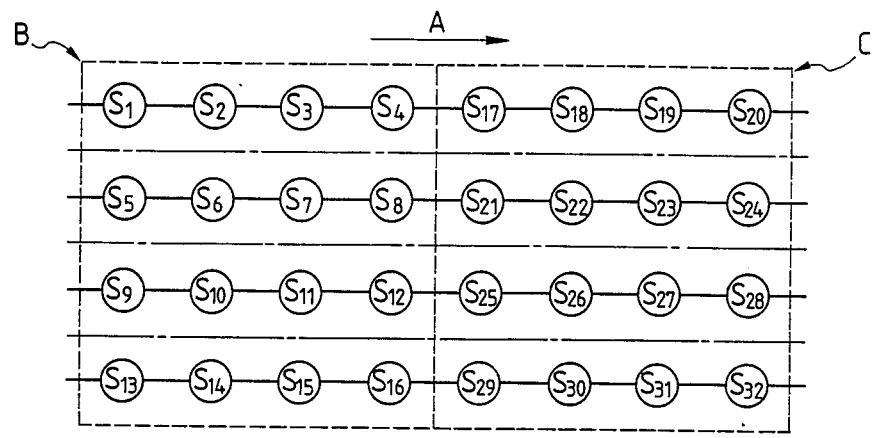
FIG. 2 is an explanatory diagram of a blocking operation in a blocking circuit.

In FIG. 1, a television signal of the NTSC system which is input from an input terminal 9 is sampled by a sampling frequency $4f_{sc}$ which is four times as high as a carrier frequency $f_{sc}$ by an A/D converter 10, thereby forming a digital television signal digitized by, e.g., eight bits per pixel. The digital television signal is supplied to a blocking (block forming) circuit 11. The blocking circuit 11 comprises a memory which can store the digital television signal of one field picture plane, a write/read control circuit of the memory, and the like. First, the digital television signals which are sequentially serially supplied in accordance with the order of $S_1$, $S_2$, $S_3$, $S_4$, $S_{17}$, $S_{18}$, ... in the direction of an arrow A shown in FIG. 2 are once stored into the memory. Next, the pixel data are sequentially read out of the memory in accordance with the order of $S_1$, $S_2$, $S_3$, $S_4$, $S_5$, $S_6$, ..., $S_{15}$, $S_{16}$, $S_{17}$, $S_{18}$, ..., $S_{31}$, and $S_{32}$. Thus, the digital television signals are divided into a plurality of blocks in a manner such that as shown by B and C in FIG. 2, four pixels in the horizontal direction surrounded by broken lines construct one block unit, while four lines in the vertical direction construct one block unit. The digital television signals are output as blocks. FIG. 2 shows the case of the interlacing scan. Lines shown by alternate long and short dash lines indicate scanning lines of the two fields.

Reference numeral 12 denotes a circuit to calculate the maximum and minimum values in an object block. The circuit 12 can be easily realized as a software or hardware. As a method of realizing the circuit 12 by a hardware consisting of a comparator and a holding circuit; for instance, in the case of calculating the maximum value, it is sufficient to construct it such that one of two inputs which has a larger value is held and supplied to the next stage. In the case of calculating the minimum value, on the contrary, one of two inputs which has a smaller value is held and transferred to the next stage. Thus, the maximum value data and the minimum value data are finally obtained.

Reference numeral 14 denotes a block encoding circuit, 16 indicates a decoding circuit, and 18 is an error calculation circuit. The pixel values of the block which are output from the blocking circuit 11 are also supplied to the circuits 14 and 18. On the basis of the maximum and minimum values calculated by the calculation circuit 12, the block encoding circuit 14 divides the values between the maximum and minimum values into n (n is an integer equal to 2 or more) sections and checks to which section each pixel data belongs. In this case, a numerical value indicative of the section to which the pixel data belongs is called an index. In this manner, the pixel data digitized by, for instance, eight bits and 256 levels can be expressed on a pixel block unit basis by the maximum and minimum values and the index of two bits. The block encoding circuit will be described in detail hereinlater. In the conventional transmitting apparatus, those data are directly transmitted. However, in the embodiment, the following processes are further executed That is, the decoding circuit 16 decodes the block encoded data by using the maximum and minimum value data which are output from the calculation circuit 12 and the index which is output from the block encoding circuit 14. The error calculation circuit 18 calculates the difference between each pixel data decoded by the decoding circuit 16 and the true value of each pixel data from the blocking circuit 11. In accordance with the error amount calculated by the error calculation circuit 18, a shifting amount calculation circuit 20 determines shifting amounts of the maximum and minimum values so as to eliminate the errors. For instance, when the total difference (that is, the sum of errors) is a large negative value, the maximum and minimum values in the pixel block are shifted to the plus side, namely, the shifting amounts are set to positive values. On the contrary, when the total difference is a large positive value, the maximum and minimum values are shifted to the minus side, that is, the shifting amounts are set to negative values. For the shifting amounts, it is sufficient that the corresponding relations between the input and output values as shown in, e.g., Table 1 are preliminarily stored into a read only memory. However, Table 1 relates to the example in the case where the pixel block consists of 16 (=4×4) pixels per block. In this example, since sixteen pixels are included in one block, when the shifting amounts of the maximum and minimum values are set to 1, the total difference in one block changes by about sixteen. The boundary value changes due to the shifting operations of the maximum and minimum values. Even if the object pixel belongs to another section, the difference does not increase and the like. Therefore, by considering the foregoing points, the relations among the total difference and the shifting amounts are determined.

When deciding the shifting amounts, the shifting amounts can be also determined on the basis of not only the total difference but also the information indicating how many decoded values having which extend of difference in the block exist, or by also considering the both. With this method, codes can be more accurately transmitted.

TABLE 1

| Total difference | Shifting amount |
|---|---|
| to −72 | 3 |
| −71 to −56 | 2 |
| −55 to −40 | 1 |
| −39 to 39 | 0 |
| 40 to 55 | −1 |
| 56 to 71 | −2 |
| 72 to | −3 |

Figure 3:
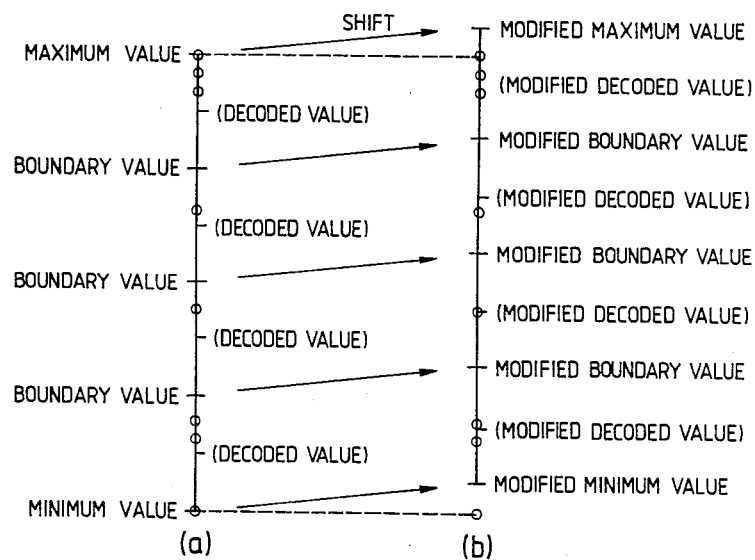
FIG. 3 is an explanatory diagram of a modifying operation for modifying maximum and minimum value data in the encoding apparatus shown in FIG. 1.

In an adding circuit 22, the shifting amount calculated by the shifting amount calculation circuit 20 is added to the maximum and minimum values calculated by the maximum/minimum value calculation circuit 12, thereby modifying them. FIG. 3 shows an example of a state of the modification. In FIG. 3, a small circle represents each pixel value. The pixel value is decoded to an intermediate value in each divided area upon decoding. FIG. 3(a) shows a state before the modification. FIG. 3(b) shows a state after the modification. When the total difference in the decoding mode has a positive value before the modification as shown in FIG. 3(a), the maximum and minimum values are shifted to the plus side as shown in FIG. 3(b). Thus, the sum of the errors which are generated upon decoding after the transmission decreases.

In accordance with the modified maximum and minimum values from the adding circuit 22, a block encoding circuit 24 shown in FIG. 1 calculates the index in a manner similar to the block encoding circuit 14 and outputs the index. The modified maximum and minimum values which are output from the adding circuit 22 and the index which is output from the block encoding circuit 24 are transmitted to other apparatuses.

Figure 4:
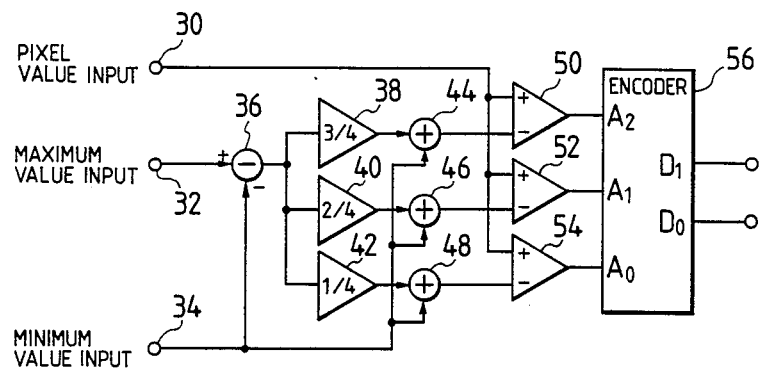
FIG. 4 is a diagram showing an example of a practical arrangement of a block encoding circuit.
Figure 5:
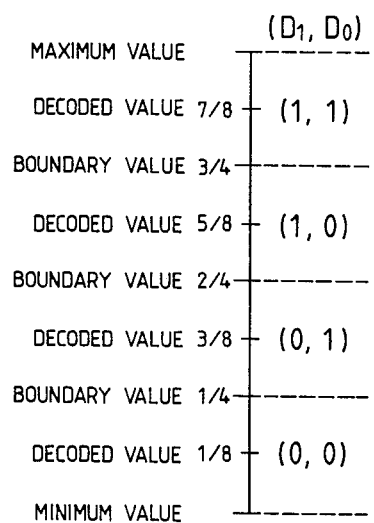
FIG. 5 is a diagram showing an example of outputs of an encoder in the block encoding circuit.

FIG. 4 is a diagram showing an arrangement of the block encoding circuit 14 shown in FIG. 1. For easy description, FIG. 4 shows the case where the division number n between the maximum and minimum values 4. The block encoding circuit 24 shown in FIG. 1 may also have the same construction. In FIG. 4, reference numeral 30 denotes an input terminal of each pixel data in the block; 32 is an input terminal of the maximum value data; and 34 is an input terminal of the minimum value data. A subtracting circuit 36 subtracts the minimum value data from the maximum value data and outputs a dynamic range data. Multiplying circuits 38, 40, and 42 multiply the dynamic range by ¾, 2/4, and ¼, respectively. Adders 44, 46, and 48 add the minimum value to the results of the multiplication. Thus, the boundary values among the divided areas are obtained. Comparators 50, 52, and 54 compare the pixel data from the input terminal 30 with the boundary values and output "1" when the input at a +terminal is larger than the input at a −terminal. The comparators output "0" in the other cases. An encoder 56 outputs the index of two bits indicative of the section to which the pixel value belongs from outputs of the comparators 50, 52, and 54. The input/output characteristics of the encoder 56 are shown in Table 2. FIG. 5 shows the corresponding relation between the pixel value and the output of the encoder 56.

TABLE 2

| Input | | | Output | |
|---|---|---|---|---|
| $A_2$ | $A_1$ | $A_0$ | $D_1$ | $D_0$ |
| 1 | 1 | 1 | 1 | 1 |
| 0 | 1 | 1 | 1 | 0 |
| 0 | 0 | 1 | 0 | 1 |
| 0 | 0 | 0 | 0 | 0 |

Figure 6:
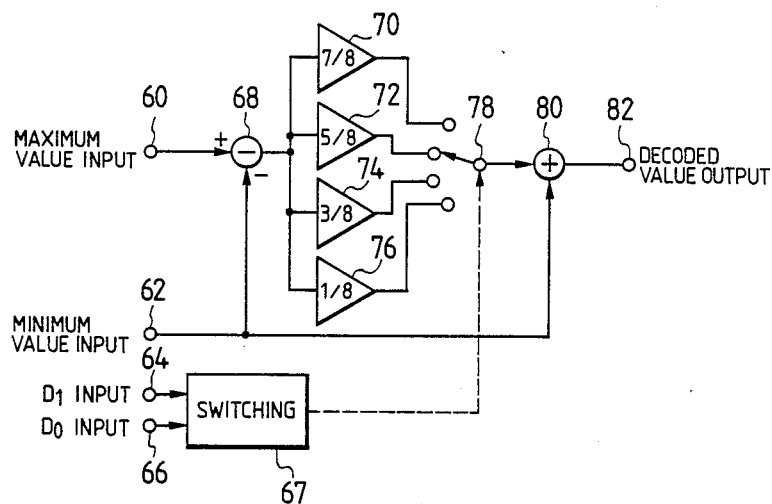
FIG. 6 is a diagram showing an example of a practical arrangement of a decoding circuit.

FIG. 6 is a diagram showing an arrangement example of the decoding circuit 16 shown in FIG. 1. In FIG. 6, the division number n of the dynamic range is 4 similarly to the case of the block encoding circuit for convenience of explanation. In FIG. 6, reference numeral 60 denotes an input terminal of the maximum value data; 62 is an input terminal of the minimum value data; and 64 and 66 are input terminals of indices $D_1$ and $D_0$ from the block encoding circuit 14 (encoder 56). A subtracting circuit 68 subtracts the minimum value from the maximum value. Further, multiplying circuits 70, 72, 74, and 76 multiply an output of the subtracting circuit 68 by ⅛, ⅜, ⅝, and ⅞ times, respectively. Outputs of the multiplying circuits 70 to 76 have the central corresponding values of the four divided sections, respectively. A switch 78 is switched by a switching circuit 67 in accordance with the two-bit index which is output from the encoder 56 with respect to each pixel, thereby selecting one of the four multiplying circuits 70 to 76. By adding the minimum value to the output of the selected one of the multiplying circuits 70 to 76 by an adding circuit 80, the decoded value of each pixel data is obtained to an output terminal 82.

In the first embodiment, the case of transmitting both of the maximum and minimum value data in the block has been described. However, a combination of the dynamic range (the difference between the maximum and minimum values) in the block and the maximum or minimum value data can be also transmitted.

Figure 7:
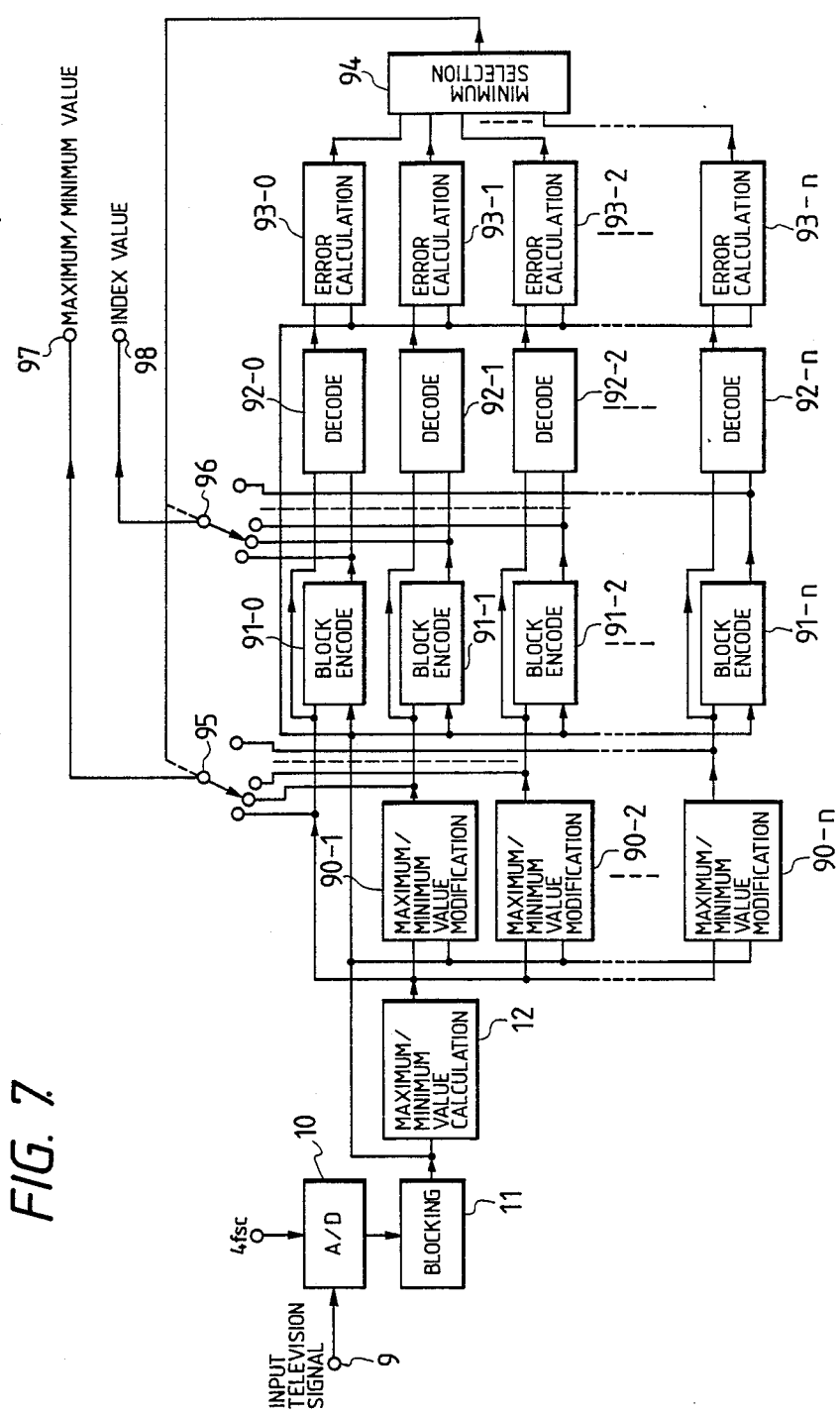
FIG. 7 is an arrangement block diagram of an encoding apparatus as the second embodiment of the invention.

FIG. 7 is a diagram showing an arrangement block of an encoding apparatus as the second embodiment of the invention.

In FIG. 7, the parts and components similar to those in FIG. 1 are designated by the same reference numerals and their detailed descriptions are omitted.

In FIG. 7, reference numeral 9 denotes the input terminal; 10 is the A/D converter; 11 the blocking circuit; and 12 the maximum/minimum value calculation circuit.

Reference numerals 90-1, 90-2, ..., 90-n denote maximum/minimum value modification circuits to finely modify the maximum and minimum value data from the maximum/minimum value calculation circuit 12 by a method which will be explained hereinbelow. Reference numerals 91-0, 91-1, ..., 91-n denote block encoding circuits to calculate index values indicating to which section each pixel data in the block belongs on the basis of the maximum and minimum value data modified by the modification circuits 90-1 to 90-n in the case where the data between the modified maximum and minimum values is equally divided into several parts. Reference numerals 92-0, 92-1, ..., 92-n denote decoding circuits to decode each pixel value from the modified maximum and minimum values and from the indices calculated by the block encoding circuits 91-0 to 91-n. Reference numerals 93-0, 93-1, ..., 93-n denote error calculation circuits for comparing the pixel data decoded by the decoding circuits 92-0 to 92-n with the true values of the pixel data from the blocking circuit 11 and for calculating the sum of the errors in the block. The error calculation is executed by, e.g., a method of adding the absolute values of the errors, a method of adding the squares of the errors, or the like. However, it is desirable to use the former method since the circuit scale is small.

Reference numeral 94 denotes a selection circuit to select the system to provide the minimum error on the basis of the results of the calculation of the error calculation circuits 93-0 to 93-n. By switching switches 95 and 96 by the selection circuit 94, the modified maximum and minimum values and the index value of the selected system are output to output terminals 97 and 98 and transmitted by a transmission path (not shown).

Figure 8:
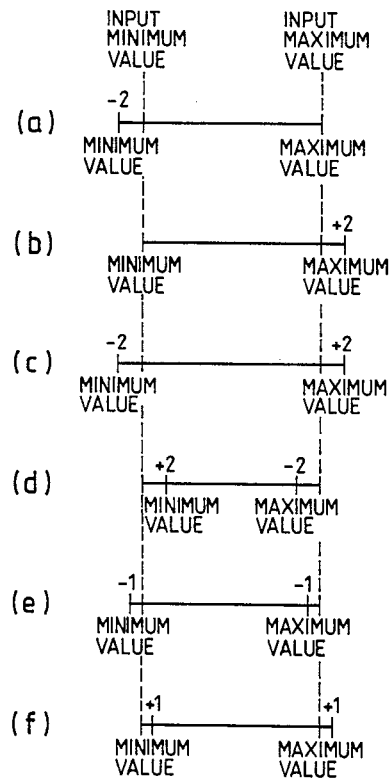
FIG. 8 is an explanatory diagram of a modifying operation for modifying the maximum and minimum value data in the encoding apparatus shown in FIG. 7.

A modifying method in the modification circuits 90-1 to 90-n will now be described. Assuming that the levels of each pixel data are 0 to 255, it is considered that the difference between the minimum and maximum values in the block is at most 128 or less. Therefore, when considering the case of dividing the data between the maximum and minimum values into sixteen equal regions, a width of one divided region is at most about eight levels. Therefore, by finely adjusting the maximum and minimum values by at most about four levels, the errors upon encoding can be reduced. FIG. 8(a) shows an example in which the minimum value is shifted to the 0 side by only two levels. FIG. 8(b) shows an example in which the maximum value is shifted to the 255 side by only two levels. FIG. 8(c) shows an example in which the maximum value is shifted to the 255 side by only two levels and the minimum value is shifted to the 0 side by only two levels. FIG. 8(d) shows an example in which the maximum value is shifted to the 0 side by only two levels and the minimum value is shifted to the 255 side by only two levels. FIG. 8(e) shows an example in which the maximum and minimum values are shifted to the 0 side by only one level. FIG. 8(f) shows an example in which the maximum and minimum values are shifted to the 255 side by only one level.

Another method of finely adjusting is also considered. However, although the picture quality is improved with an increase in the number of modification patterns, there is a drawback such that the scale of hardware also enlarges. From the experiments, the result such that the errors are reduced by finely adjusting the maximum and minimum values by one to four levels, respectively, was obtained.

Practical arrangement examples of the block encoding circuits 91-0 to 91-n shown in FIG. 7 have the same arrangement as the block encoding circuit 14 shown in FIG. 4. However, in FIG. 7, the maximum value data modified by the modification circuits 90-1 to 90-n in FIG. 7 or the non-modified maximum value data are supplied to the input terminal 32 in FIG. 4. The minimum value data modified by the modification circuits 90-1 to 90-n in FIG. 7 or the non-modified minimum value data are supplied to the input terminal 34.

Practical arrangement examples of the decoding circuits 92-0 to 92-n shown in FIG. 7 have the same arrangement as the decoding circuit 16 shown in FIG. 6. However, the maximum value data modified by the modification circuits 90-1 to 90-n in FIG. 7 or the non-modified maximum value data are supplied to the input terminal 60 in FIG. 6. The minimum value data modified by the modification circuits 90-1 to 90-n in FIG. 7 or the non-modified minimum value data are supplied to the input terminal 62.

TABLE 3

| Input | | | | | | Output | | Minimum |
|---|---|---|---|---|---|---|---|---|
| $I_5$ | $I_4$ | $I_3$ | $I_2$ | $I_1$ | $I_0$ | $O_1$ | $O_0$ | value |
| 1 | 1 | | | 1 | | 1 | 1 | $D_2$ |
| 1 | 1 | | | | 0 | 0 | 1 | $D_4$ |
| 1 | 0 | — | 1 | | | 1 | 0 | $D_3$ |
| 1 | 0 | | | 0 | | 0 | 1 | $D_4$ |
| 0 | 1 | 1 | | | | 1 | 1 | $D_2$ |
| 0 | 1 | 0 | | | | 0 | 0 | $D_5$ |
| 0 | 0 | 1 | | | | 1 | 0 | $D_3$ |
| 0 | 0 | 0 | | | | 0 | 0 | $D_5$ |

Figure 9:
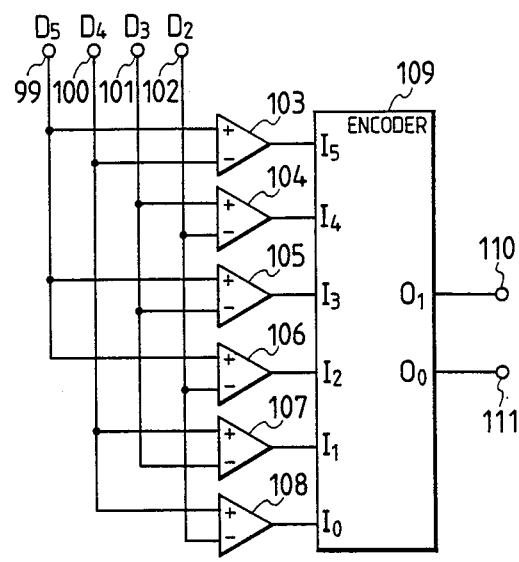
FIG. 9 is a diagram showing an example of a practical arrangement of an error selection circuit in the encoding apparatus shown in FIG. 7.

FIG. 9 shows an arrangement example of the selection circuit 94 in FIG. 7 and relates to the case where four error signals are input. The error values from the error calculation circuits 93-0 to 93-n in FIG. 7 are input to input terminals 99 to 102. The magnitudes between every two inputs are compared by comparators 103 to 108. When the error value input to the −terminal is larger, "1" is output. An encoder 109 outputs two-bit signals to specify the input terminal of the minimum error from output terminals 110 and 111 on the basis of the results of the comparison from the comparators 103 to 108. Table 3 shows the input/output characteristics of the encoder 109 and the results of the decision of the minimum error. The encoder 109 can be easily realized by using a read only memory.

The switches 95 and 96 are switched in accordance with outputs $O_1$ and $O_0$ of the encoder 109.

By selecting the maximum and minimum values to minimize the error and the index value of each pixel, the degree of deterioration in picture quality upon decoding can be reduced than the conventional one. Although the second embodiment has been described with respect to the example in the case of transmitting the maximum and minimum value data in the pixel block, either one of the maximum and minimum value data and the dynamic range value (the difference between the maximum and minimum values) can be also transmitted.

Figure 10:
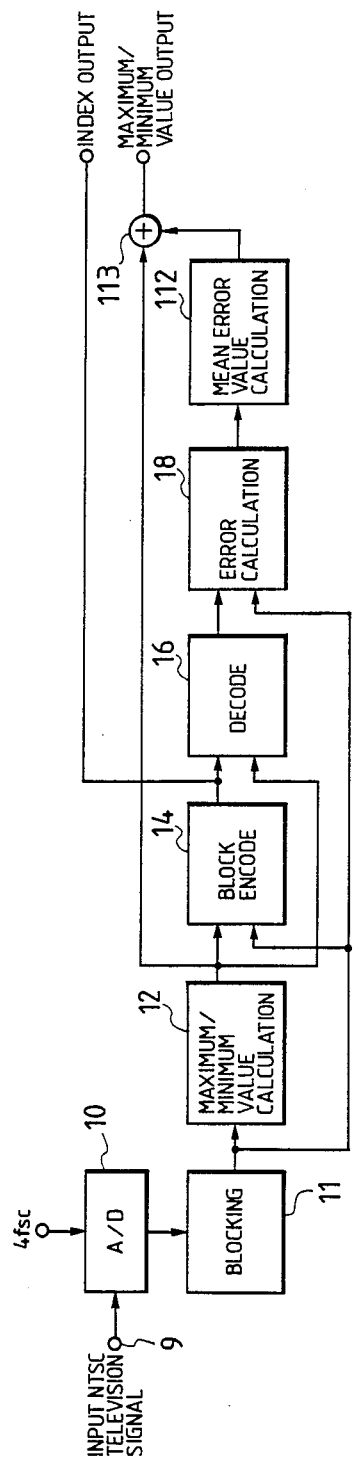
FIG. 10 is an arrangement block diagram of an encoding apparatus as the third embodiment of the invention.

FIG. 10 is a diagram showing an arrangement block of an encoding apparatus as the third embodiment of the invention.

In FIG. 10, the parts and components similar to those in FIG. 1 are designated by the same reference numerals and their detailed descriptions are omitted.

In FIG. 10, reference numeral 9 denotes the input terminal; 10 is the A/D converter; 11 the blocking circuit; 12 the maximum/minimum value calculation circuit; 14 the block encoding circuit; 16 the decoding circuit; and 18 the error calculation circuit. These circuits have the same arrangements as those in the first embodiment mentioned above.

In the third embodiment, the following processes are further executed in addition to the foregoing processes.

That is, the decoding circuit 16 decodes the block encoded data by using the maximum and minimum value data which are output from the maximum/minimum value calculation circuit 12 and the index which is output from the block encoding circuit 14. The error calculation circuit 18 calculates the difference between each pixel data decoded by the decoding circuit 16 and the true value of each pixel data from the blocking circuit 11. A mean error value calculation circuit 112 calculates a mean value of the error amounts calculated by the error calculation circuit 18. The mean error value which is output from the mean error value calculation circuit 112 is applied to an adding circuit 113. The adding circuit 113 adds the mean error value to the maximum and minimum values calculated by the maximum/minimum value calculation circuit 12 and modifies the maximum and minimum values. The modifying operations correspond to the processes such that the offset is added to the maximum and minimum values serving as reference values to calculate the pixel data upon decoding. The mean error in the block is reduced by the amount of offset.

Figure 11:
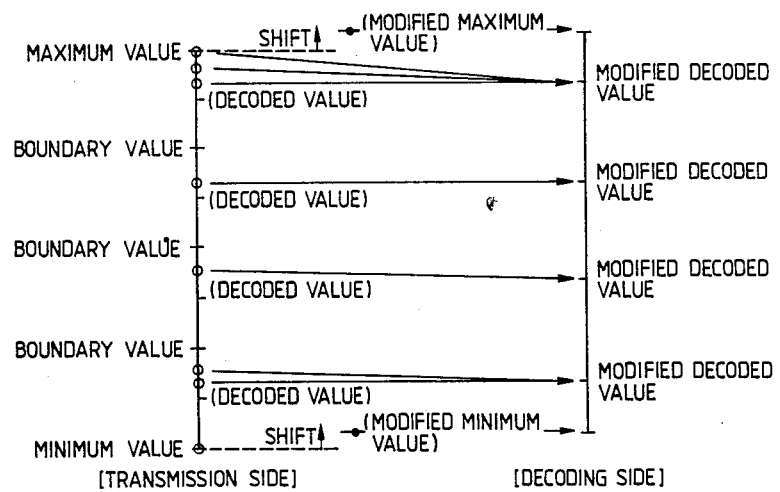
FIG. 11 is an explanatory diagram of a modifying operation for modifying the maximum and minimum value data in the encoding apparatus shown in FIG. 10.

FIG. 11 shows an example of a state of the modification. A small circle in the diagram denotes each pixel value. The pixel value is decoded to the intermediate value in each divided area upon decoding. For instance, assuming that the sum of errors upon decoding in the state before modification is M, the shifting amount in FIG. 11 is obtained by M/N (N denotes the number of pixels in the block). The value of M/N is subtracted from the maximum and minimum values and the resultant data are transmitted by a transmission path (not shown). On the reception (decoding) side, the index value of each pixel data is decoded by using the modified maximum and minimum values as reference values, thereby enabling the errors to be reduced as compared with the decoded values before modification.

As described above, according to the arrangements shown in the first to third embodiments, the digitization errors can be reduced and the image signal with less deterioration of the picture quality can be encoded.

Figure 12:
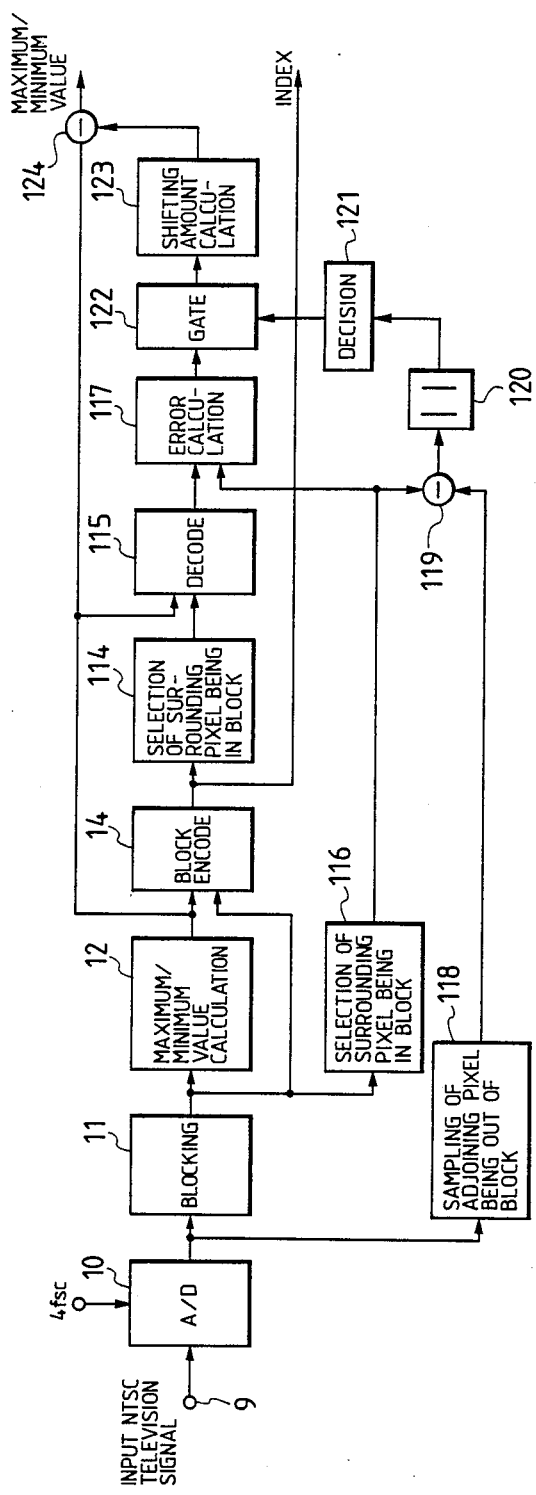
FIG. 12 is an arrangement block diagram of an encoding apparatus as the fourth embodiment of the invention.

The fourth embodiment of the invention will now be described with reference to FIG. 12. In FIG. 12, the same parts and components as those in FIG. 11 are designated by the same reference numerals. The blocking circuit 11 to the block encoding circuits 14 are the same as those in the case of FIG. 1. A selection circuit 114 for selecting a surrounding pixel in the block consists of a memory, a write/read control circuit of the memory, and the like. Among the indices calculated by the block encoding circuit 14, the selection circuit 114 selects the index regarding the surrounding pixel data of the block and supplies it to a decoding circuit 115. The decoding circuit 115 has the same construction as the decoding circuit 16 in FIG. 1. A selection circuit 116 of a surrounding pixel of the block selects the corresponding surrounding pixel data of the block from the output of the block encoding circuit 11 in a manner similar to the selection circuit 114. An error calculation circuit 117 compares the decoded value of the encoded surrounding pixel data from the decoding circuit 115 with the true values of the surrounding pixel data from the selection circuit 116 and calculates the error.

On the other hand, in order to detect the correlation between blocks, in the embodiment, a sampling circuit 118 to sample adjoining pixel being out of a block fetches the pixel data locating out of the block which is at present being encoded and adjoining to this block. The sampling circuit 118 comprises: a memory which can store the digital television signals of one field picture plane; a write/read control circuit of the memory; and the like, in a manner similar to the blocking circuit 11. The correlation amount is calculated by a difference detecting circuit 119 and an absolute value detecting circuit 120. A decision circuit 121 discriminates whether there is a correlation or not on the basis of the correlation amount (the absolute value of the difference), thereby deciding whether the maximum and minimum values are modified or not on the basis of the result of the calculation of the error calculation circuit 117. That is, a gate circuit 122 is opened or closed in accordance with the result of the decision. In place of the gate circuit 122, it is also possible to use an attenuating (amplifying) circuit whose attenuation ratio (or amplification factor) changes in accordance with the correlation amount. A shifting amount calculation circuit 123 calculates the shifting amount from an output of the gate circuit 122 and supplies to an adding circuit 124. The adding circuit 124 adds the shifting amount to the maximum and minimum values, thereby modifying the maximum and minimum values.

The feature of the embodiment will be summarized as follows. First, the maximum and minimum value data are modified on the basis of the decoded error of the surrounding pixel in the block. Second, the surrounding pixel in the block is compared with the surrounding pixel out of the block and it is decided if the modification is performed or not on the basis of the correlation between blocks.

Although the fourth embodiment has been described with respect to the case of transmitting the maximum and minimum value data in the block, it is also possible to transmit a combination of the dynamic range (the difference between the maximum and minimum values) in the block and the maximum or minimum value data.

As described above, according to the fourth embodiment, the image signal can be efficiently encoded such that the boundary between blocks does not become clear in the decoded image without being influenced by the distribution of the pixel levels in the block. On the reception side, an image with less deterioration in picture quality can be reproduced.

We claim:

1. An image signal encoding apparatus for encoding an image signal comprising:
    (A) blocking means for receiving image signals of one picture plane consisting of a plurality of image data and for dividing said image signals into a plurality of blocks each consisting of a predetermined number of pixel data;
    (B) reference value data forming means for forming a pair of reference value data regarding maximum and minimum values of levels of the pixel data of the block, for each of the blocks;
    (C) encoding means for encoding each of the pixel data of the block on the basis of the reference value data which are formed by said reference value data forming means for every block, for forming encoded data, and for outputting the encoded data;
    (D) decoding means for decoding the encoded data formed by said encoding means on the basis of the reference value data formed by the reference value data forming means and for forming decoded data;
    (E) error detecting means for comparing the pixel data output from said blocking means for every block with the decoded data formed by said decoding means and for detecting errors; and
    (F) correcting means for correcting the reference value data formed by said reference value data forming means in accordance with the result of the detection by said error detecting means and for outputting corrected reference value data.

2. An image signal encoding apparatus for encoding an image signal, comprising:
    (A) blocking means for receiving image signals of one picture plane consisting of a plurality of image data and for dividing said image signals into a plurality of blocks each consisting of a predetermined number of pixel data;
    (B) reference value data forming means for forming a pair of reference value data regarding maximum and minimum values of levels of the pixel data of the block, for each of the blocks;
    (C) shifting data calculating means for shifting the reference value data formed by said reference value data forming means and for calculating a plurality of kinds of different shifting data;
    (D) a plurality of encoding circuits for encoding each of the pixel data constituting the block on the basis of the reference value data formed by said reference value data forming means and said plurality of kinds of shifting data formed by said shifting data calculating means for every block and for forming a plurality of kinds of encoded data;
    (E) decoding means for decoding the encoded data formed by said encoding circuits on the basis of the reference value data formed by the reference value data forming means and for forming decoded data;
    (F) error detecting means for comparing the pixel data output from said blocking means for every block with the decoded data formed by said decoding means and for detecting errors; and
    (G) correcting means for correcting the reference value data formed by said reference value data forming means in accordance with the result of the detection by said error detecting means and for outputting corrected reference value data.

3. An apparatus according to claim 2, wherein said decoding means includes a plurality of decoding circuits for decoding said plurality of kinds of encoded data formed by said plurality of encoding circuits on the basis of the reference value data formed by the reference value data forming means and said plurality of kinds of shifting data formed by said shifting data calculating means and for forming a plurality of kinds of decoded data.

4. An apparatus according to claim 3, wherein said error detecting means includes a plurality of error detecting circuits for comparing the pixel data output for every block from said blocking means with said plurality of decoded data formed by said plurality of decoding circuits and for detecting errors.

5. An apparatus according to claim 4, wherein said correcting means includes selection output means for selecting either one of said reference value data and said plurality of kinds of shifting data which were formed by said reference value data forming means and said shifting data calculating means in accordance with the results of the detection by said plurality of error detecting circuits and for outputting.

6. An apparatus according to claim 1, wherein said error detecting means includes an error data calculation circuit for comparing the pixel data which is output for every block from said blocking means with the decoded data formed by said decoding means and for calculating error data.

7. An apparatus according to claim 6, wherein said correcting means includes:
   (A) mean error value data calculating means for calculating a mean value of the error data calculated by said error data calculation circuit and for forming mean error value data; and
   (B) adding means for adding the mean error value data formed by said mean error value data calculating means to the reference value data formed by said reference value data forming means and for outputting.

8. An apparatus according to claim 1, wherein said error detecting means includes sampling means for sampling and outputting only the pixel data located around the block among the pixel data which are output for every block by said blocking means, and the error detecting means is arranged so as to compare the pixel data sampled by said sampling means with the decoded data formed by said decoding means and to detect errors.

9. An apparatus according to claim 1, further comprising:
   (A) correlation detecting means for detecting a correlation between blocks for each of the blocks produced by said blocking means; and
   (B) correction amount control means for controlling a correcting amount of the reference value data in said correcting means in accordance with the result of the detection by said correlation detecting means.

10. An image signal encoding apparatus for encoding an image signal comprising:
   (A) blocking means for receiving image signals of one picture plane consisting of a plurality of pixel data and for dividing said image signals into a plurality of blocks each consisting of a predetermined number of pixel data;
   (B) reference value data forming means for forming a pair of reference value data regarding maximum and minimum values of levels of the pixel data of the block, for each of the blocks;
   (C) first encoding means for encoding each of the pixel data of the block on the basis of the reference value data formed by said reference value data forming means for every block, for forming first encoded data, and for outputting the first encoded data;
   (D) decoding means for decoding the first encoded data formed by said first encoding means on the basis of the reference value data formed by said reference value data forming means and for forming decoded data;
   (E) error detecting means for comparing the pixel data output for every block by said blocking means with the decoded data formed by said decoding means and for detecting errors;
   (F) correcting means for correcting the reference value data formed by said reference value data forming means in accordance with the result of the detection by said error detecting means and for outputting corrected reference value data; and
   (G) second encoding means for encoding each of the pixel data of the block on the basis of the reference value data corrected by said correcting means for every block, for forming second encoded data, and for outputting the second encoded data.

11. An apparatus according to claim 10, wherein said first encoding means includes:
   (A) digitization level setting means for digitizing a dynamic range indicative of the reference value data formed by said reference value data forming means and for setting a plurality of different digitization levels; and
   (B) comparing means for comparing the level of each of the pixel data constructing the block with said plurality of digitization levels set by said digitization level setting means and for outputting the first encoded data indicate to which digitization level said pixel data belongs in accordance with the result of the comparison.

12. An apparatus according to claim 10, wherein said second encoding means includes:
   (A) digitization level setting means for digitizing the dynamic range indicative of the reference value data corrected by said correcting means and for setting a plurality of different digitization levels; and
   (B) comparing means for comparing the level of each of the pixel data of the block with said plurality of digitization levels set by said digitization level setting means and for outputting the second encoded data indicate to which digitization level said pixel data belongs in accordance with the result of the comparison.

13. An apparatus according to claim 10, wherein said error detecting means includes an error data calculation circuit for comparing the pixel data which is output for every block from said blocking means with the decoded data formed by said decoding means and for calculating error data.

14. An apparatus according to claim 13, wherein said correcting means includes:
   (A) mean error value data calculating means for calculating a mean value of the error data calculated by said error data calculation circuit and for forming mean error value data; and
   (B) adding means for adding the mean error value data formed by said mean error value data calculating means to the reference value data formed by said reference value data forming means and for outputting the result of the addition.

15. An apparatus according to claim 10, wherein said error detecting means includes sampling means for sampling and outputting only the pixel data located around the block among the pixel data which are output for every block by said blocking means, and the error detecting means is arranged so as to compare the pixel data sampled by said sampling means with the decoded data formed by said decoding means and to detect errors.

16. An apparatus according to claim 10, further comprising:

(A) correlation detecting means for detecting a correlation between blocks for each of the blocks produced by said blocking means; and (B) correction amount control means for controlling a correcting amount of the reference value data in said correcting means in accordance with the result of the detection by said correlation detecting means.

* * * * *

UNITED STATES PATENT AND TRADEMARK OFFICE
CERTIFICATE OF CORRECTION

PATENT NO. : 4,953,019

DATED : August 28, 1990

INVENTOR(S) : AKIHIRO SHIKAKURA, ET AL.

It is certified that error appears in the above-identified patent and that said Letters Patent is hereby corrected as shown below:

ON THE TITLE PAGE:

Under United States Patent [19], "Skikakura et al." should read --Shikakura et al.--.

IN [75] INVENTORS

"Akihiro Skikakura" should read --Akihiro Shikakura--.

IN [30] FOREIGN APPLICATION PRIORITY DATA

"Nov. 28, 1987 [JP] Japan" should read --Nov. 27, 1987 [JP] Japan--.

IN [57] ABSTRACT

Line 2, "image of" should read --image signals of--.

UNITED STATES PATENT AND TRADEMARK OFFICE
CERTIFICATE OF CORRECTION

PATENT NO. : 4,953,019
DATED : August 28, 1990
INVENTOR(S) : AKIHIRO SHIKAKURA, ET AL.

It is certified that error appears in the above-identified patent and that said Letters Patent is hereby corrected as shown below:

COLUMN 1

Line 21, "pixels and, or one of those values" should read --pixels, or one of those values and--.

COLUMN 2

Line 6, "data" should read --data,--.
    Line 13, "comparing" should read --comparing,--.

COLUMN 3

Line 61, "executed" should read --executed.--.

COLUMN 5

Line 6, "values 4." should read --values is 4.--.
    Line 51, "$\frac{1}{8}$ times," should read --$\frac{1}{8}$,--.

COLUMN 7

Line 62, "reduced than" should read --reduced below--.

COLUMN 9

Line 13, "adjoining pixel" should read --an adjoining pixel--.
    Line 35, "supplies to" should read --supplies to it--.

UNITED STATES PATENT AND TRADEMARK OFFICE
CERTIFICATE OF CORRECTION

PATENT NO. : 4,953,019

DATED : August 28, 1990

INVENTOR(S) : AKIHIRO SHIKAKURA, ET AL.

It is certified that error appears in the above-identified patent and that said Letters Patent is hereby corrected as shown below:

COLUMN 12

Line 25, "constructing" should read --of--.
    Line 28, "data indicate" should read --data to indicate--.
    Line 42, "data indicate" should read --data to indicate--.

Signed and Sealed this

Eleventh Day of June, 1991

Attest:

HARRY F. MANBECK, JR.

*Attesting Officer*     *Commissioner of Patents and Trademarks*